Figure 1:
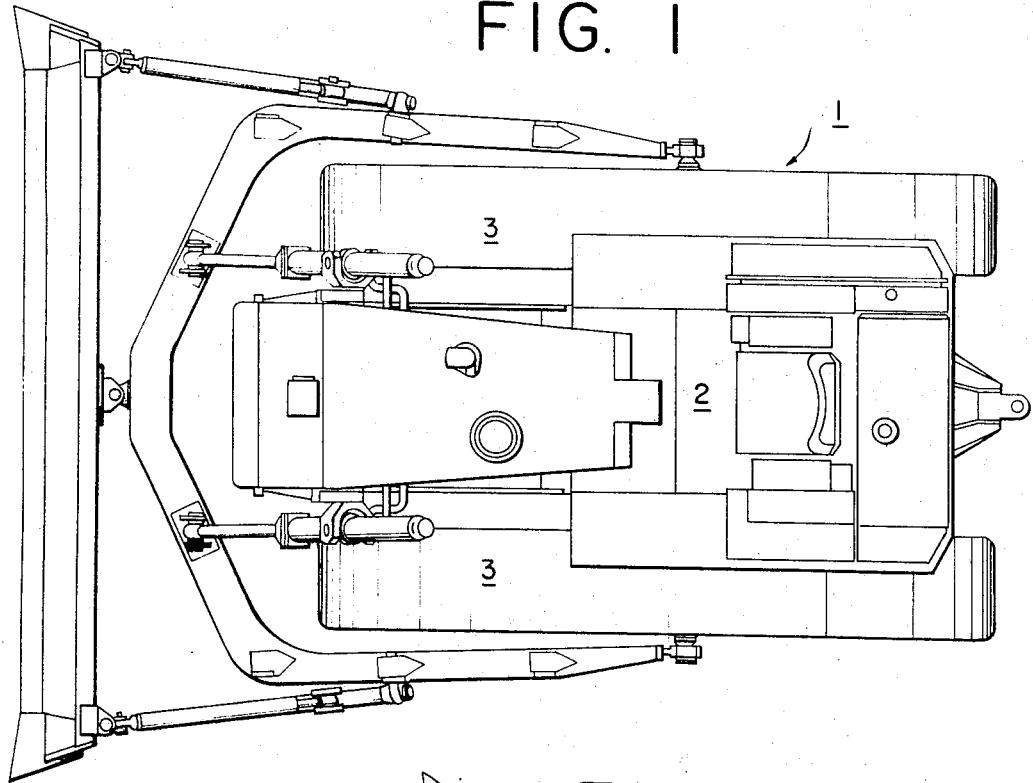

United States Patent [19]

Ishida

[11] 3,765,730
[45] Oct. 16, 1973

[54] DEVICE FOR AUTOMATICALLY ADJUSTING TRACK SHOE ASSEMBLY IN CRAWLER TRACTOR

[75] Inventor: Susumu Ishida, Komatsu, Japan

[73] Assignee: Kabushiki Kaisha Komatsu Seisakusho, Tokyo, Japan

[22] Filed: July 30, 1971

[21] Appl. No.: 167,773

[30] Foreign Application Priority Data
July 31, 1970 Japan.............................. 45/76231

[52] U.S. Cl. ............................................. 305/10
[51] Int. Cl............................................ B62d 55/30
[58] Field of Search......................... 305/10; 91/412

[56] References Cited
UNITED STATES PATENTS
2,272,091 2/1942 Loewe ................................. 91/412
2,818,311 12/1957 Ashley ................................. 305/10
3,409,335 11/1968 Piepho ................................. 305/10

Primary Examiner—Richard J. Johnson
Assistant Examiner—Reinhard J. Eisenzopf
Attorney—James E. Armstrong et al.

[57] ABSTRACT

A device for automatically adjusting the track shoe assembly in a crawler tractor which comprises serially providing a spring whose rear end is supported on the track frame, a capacity variable pressure storing chamber containing pressurized fluid, and a capacity variable adjusted pressure chamber for containing pressurized fluid for operating the piston provided on the end of the rod connected to the front idler of the track assembly; automatically feeding the pressurized fluid of said pressure storing chamber into said adjusted pressure chamber when the pressure of the fluid of said adjusted pressure chamber is insufficient to expand the track by operating the front idler through said piston with said automatic feeding of pressurized fluid, wherein when the pressure of the fluid of said adjusted pressure chamber is large, said spring is loosened through the pressurized fluid within said pressure storing chamber to reduce the impact given to said front idler and track.

7 Claims, 7 Drawing Figures

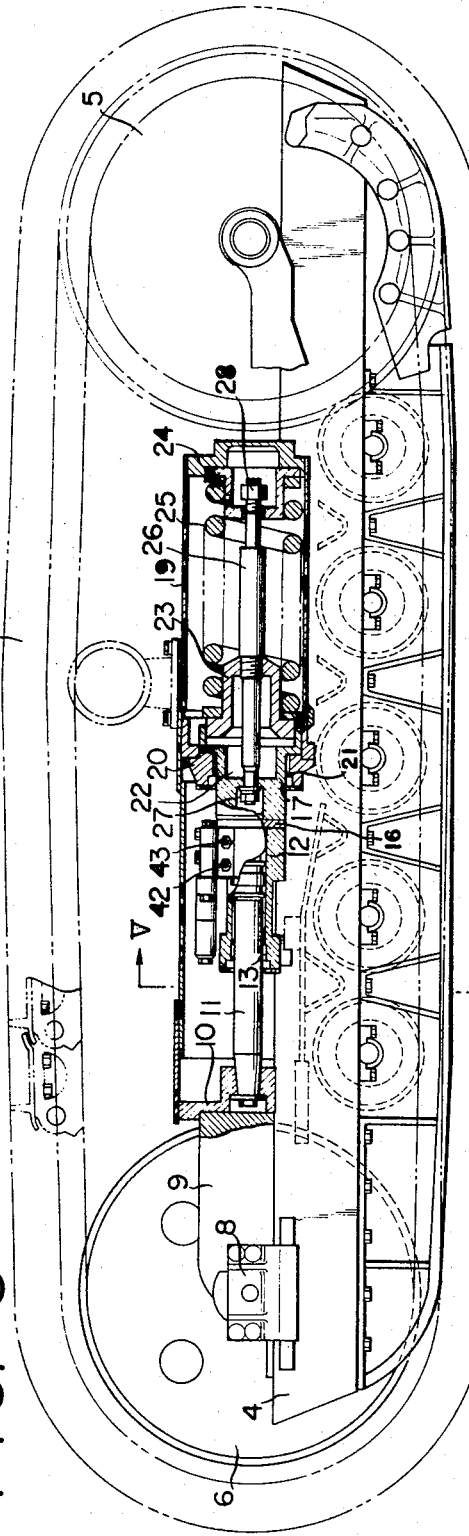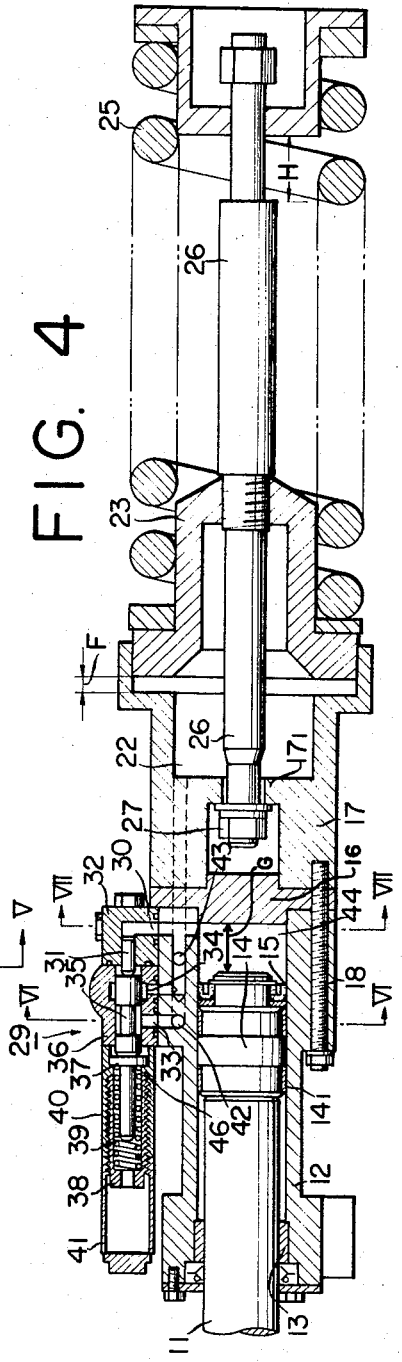

3,765,730

DEVICE FOR AUTOMATICALLY ADJUSTING TRACK SHOE ASSEMBLY IN CRAWLER TRACTOR

SUMMARY OF THE INVENTION

The present invention relates to the track shoe assembly of a crawler tractor, and in particular, the present invention relates to a device for properly adjusting the track shoe assembly in a crawler tractor comprising displacing to and fro the position for attaching the front idler to the tractor frame to bring the front idler nearer to or farther from the sprocket to the effect that the track shoe assembly spanned on said sprocket and front idler can be properly adjusted.

Generally speaking, the track shoe of a crawler tractor can be loosened along with the increase of the cruising time by the elongation of the track shoe itself or by the abrasion of upper and lower carrier rollers.

When the track shoe is loosened, proper expansion is given to the track shoe assembly by adjusting the position for attaching the front idler to the track frame by utilizing non-compressive fluid or a screw artificially in accordance with the prior art.

Therefore, in accordance with the prior art, labor is required and every time the track shoe assembly is desired to be expanded, the ooperator must go as far as the position for attaching said front idler.

The first object of the present invention is to provide a device for automatically adjusting the track shoe assembly of a crawler tractor and which is capable of giving proper expansion to the track shoe assembly by removing the relaxation of the track shoe assembly in such a manner that the position of the front idler can be automatically changed by using non-compressive pressurized fluid.

Another object of the present invention is to provide a device for automatically adjusting the track shoe assembly of a crawler tractor and which is capable of utilizing a buffer spring attaching position as the load source to which non-compressive pressurized fluid is supplied, and by using a specific valve in the pressure adjustment of the non-compressive pressurized fluid to be used for displacing the position of the front idler.

Another object of the present invention is to provide a device for automatically adjusting the track shoe assembly of a crawler tractor and which is capable of easily carrying out the adjustment of the pressure even if the pressure given to the front idler for obtaining the proper expansion of the track shoe assembly should be changed by the kind or weight of the track shoe assembly or the conditions of the ground.

Other objects and the characteristics of the present invention will be easily clarified to those skilled in the art from the following detailed explanations of the present invention given in accordance with the attached diagrams of a preferred embodiment of this invention.

The device for automatically adjusting the track shoe assembly of a crawler tractor of the present invention comprises serially providing a spring whose rear end is supported on the track frame, capacity variable pressure storing chamber containing pressurized fluid, and capacity variable adjusted pressure chamber for containing pressurized fluid for operating the piston provided on the end of the rod connected to the front idler of the track assembly; automatically feeding the pressurized fluid of said pressure storing chamber into said adjusted pressure chamber when the pressure of the fluid of said adjusted pressure chamber is small to expand the track by operating the front idler through said piston with said automatic feeding of pressurized fluid, wherein when the pressure of the fluid of said adjusted pressure chamber is large, said spring is relaxed through the pressurized fluid within said pressure storing chamber to reduce the impact given to said front idler and track.

BRIEF EXPLANATION OF THE ATTACHED DIAGRAMS

Figure 2:
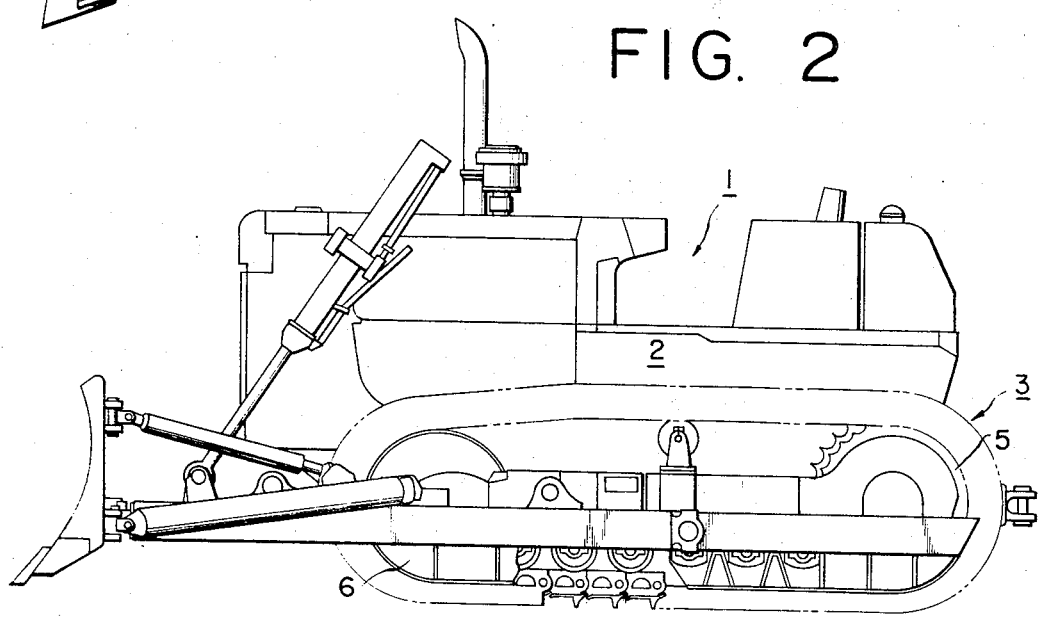

FIG. 1 and FIG. 2 are the diagrams showing a plan view of the whole crawler tractor and a side view thereof.

Figure 5:
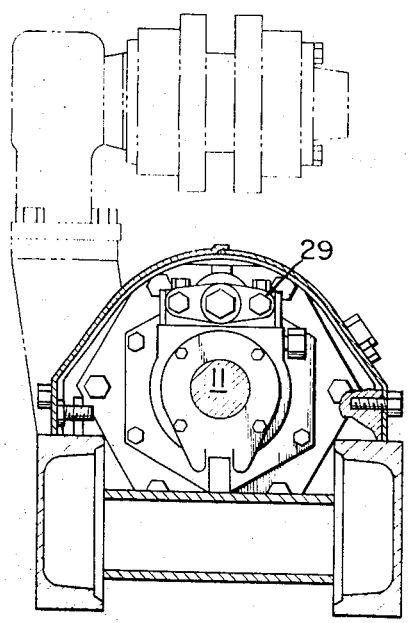
Figure 7:
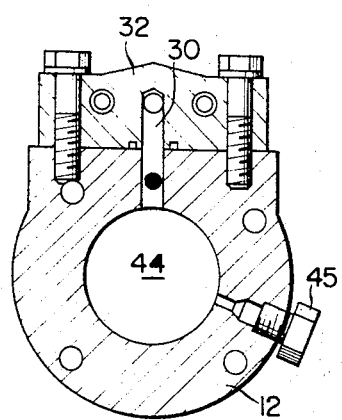
Figure 6:
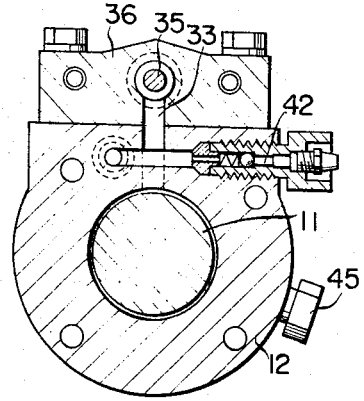

FIG. 3 through FIG. 7 are the diagrams showing the embodiments of the device for automatically adjusting the track shoe assembly of a crawler tractor of the present invention, and FIG. 3 is a diagram showing the partially cut off side view of the track shoe assembly thereof; FIG. 4 is a diagram showing the enlarged cross sectional view of the main portion thereof; FIG. 5 is a diagram showing the cross sectional view across V — V line of FIG. 3; and FIG. 7 is a diagram showing the cross sectional view along VII — VII line of FIG. 4.

DETAILED EXPLANATION OF THE INVENTION

In the following paragraphs, the embodiments of the present invention are explained more in detail in accordance with the attached diagrams.

FIG. 1 and FIG. 2 are the diagrams showing the plan view of the whole crawler tractor such as a bulldozer and the side view thereof, and in the diagrams, track assemblies 3 are provided on both sides of the tractor body 2.

FIG. 3 is a diagram showing a side view of said track assembly, and in the diagram, on the upper portion of the rear portion of the track frame 4, the sprocket 5 is rotatably supported as in a conventional crawler tractor, and on the upper portion of the front area of the track frame 4, the front idler 6 is rotatably supported in such a manner that said front idler 6 can be moved to and fro, and track shoe 7 is spanning over said sprocket 5 and the front idler 6.

The bracket 9 fixed on the bearing 8 for supporting the rotary shaft of the front idler 6 is connected to the rod 11 through the yoke 10.

As is shown in FIG. 4, the rod 11 can make sliding movement along the bush 13 and the guide and is pressed into the cylinder 12, and at the end of the rod 11 within the cylinder 12, the piston 14 having guide bush 14₁ inserted therein, is fixed, and the seal packing 15 is attached to the piston 14.

The cylinder 12 is secured in unit form to the cylinder 17 by means of the bolt 18, and the adjusted pressure chamber 44 is formed between said piston 14 and the partition wall 16.

Cylinder 17 can make sliding movement along the bush 21 and the guide and is pressed into the cover 20 secured on the front end of the spring containing cylinder 19, and is prevented from being removed from the spring containing cylinder 19 by means of the cover 20.

The spring containing cylinder 19 is secured onto the track frame 4.

The spring 25 is provided between the seat 23 for forming the pressure storing chamber 22 and is movably inserted into the cylinder 17, and the seat 24 provided on the rear end of the spring containing cylinder 19.

The rod 26 is secured on the central portion of the seat 23, and both ends of the rod 26 are movably inserted into the cylinder 17 and the seat 24, and on the respective end portions thereof, the stoppers 27 and 28 are provided.

The valve 29 is unitedly provided on an appropriate portion along the outer periphery of the cylinder 17.

The valve 29 has, as is shown in FIG. 4 and FIG. 7, a port 30 connected to said adjusted pressure chamber 44 and has the member 32 in which the spool 31 is contained, the port 33 connected to said pressure storing chamber 22, and the port 34 connected to the adjusted pressure chamber 44, and the member 36 in which the spool 35 for connecting and disconnecting said two ports 33, 34, is contained, the member 40 in which the adjusting spring 39 provided between the movable spring receiver 37 and the position adjustable cap 38, and the cap 41.

The feeding inlet opening 42 for feeding non-compressive fluid is connected to the port 33 and the pressure storing chamber 22, and the feeding opening 43 is connected respectively to the port 34, the port 30, and the adjusted pressure chamber 44.

On the other hand, the drain plug 45 for removing the non-compressive fluid, is provided on the cylinder wall 12 connected to the adjusted pressure chamber 44.

In the following paragraphs, the features of an embodiment of the present invention are described.

There is no pressurized fluid in the adjusted pressure chamber 44 and the pressure storing chamber 22 right after the completion of the assembly in which non-compressive fluid is not supplied from the feeding openings 42 and 43.

In this state, when the non-compressive fluid is supplied from the feeding opening 43, the non-compressive fluid is introduced into the port 30, the port 34, and the adjusted pressure chamber 44, and the non-compressive fluid pushes the rod 11 through the piston 14 to displace the front idler 6.

When the proper expansion is given to the track shoe 7 by means of the displacement of the front idler 6, the feeding of non-compressive fluid is stopped.

In this case, when the feeding of non-compressive fluid is stopped, the piston 14 is on such a position that the piston 14 and the partition wall 16 are separated by the interval G, as is shown in FIG. 4.

The pressure of the non-compressive fluid in the port 34, although said pressure cannot operate the spool 35, works on the spool 31, and pushes the spring receiver 37 through the spool 35 to loosen the spring 39, and the spring receiver 37 is contacted against the stopper 46 of the member 40.

Next, when the non-compressive fluid is supplied from the feeding opening 42, the pressurized fluid is introduced into the port 33 and the pressure storing chamber 22.

In this state, pressurized fluid is only introduced into the port 33, and no other effects can be attained, but the pressurized fluid of the pressure storing chamber 22 pushes the seat 23 against the spring 25, as long as the stopper 27 of the end of the rod 26 is contacted against the end wall $17_1$ of the cylinder 17, i.e., as long as the interval remains at maximum as is shown in FIG. 4.

When the stopper 27 is contacted against the end wall $17_1$ of the cylinder 17, it is impossible to supply the non-compressive fluid any more.

In such a state as described above, the pressure of the spring 25 is always charged into the adjusted pressure chamber 44.

The interval as is shown by H in FIG. 4, is the stroke distance when the spring 25 works to buffer impact.

The respective pressures in the above described state are as follows;

The following relation is always present between the respective hydraulic pressures.

FORMULA:

$$P_2 > P_3 >> P_1 \geqq P_5 \geqq P_4$$

under the condition of → $\{P_1 \geqq P_4\}$

[wherein $P_1$ is the pressure of the fluid in the adjusted pressure chamber 44 when the track shoe is properly expanded; $P_2$ is the pressure of the fluid in the pressure storing chamber 22 when the spring 25 is loosened and the interval F is at maximum; $P_3$ is the pressure of the fluid of the pressure storing chamber 22 when the interval F is at minimum; $P_4$ is the pressure of the fluid of the port 30 (the adjusted pressure chamber 44) when the pressure adjusting spring 39 starts to push the spool 35; $P_5$ is the pressure of the fluid of the port 30 (the adjusted pressure chamber 44) when the spool 35 starts to move and the port 33 and the port 34 start to be connected to each other].

Therefore, in the primary state of track shoe assembly, the above mentioned relation is satisfied, but along with the passing of cruising time, the track shoe is loosened, and the pressure $P_1$ of the fluid within the adjusted pressure chamber 44 is lowered, the pressure of the fluid in the port 30, is also lowered, and the pressure adjusting spring 39 pushes the spool 35 and the spool 31 to the right, and the pressurized non-compressive fluid within the port 30 is pushed out to be introduced into the adjusted pressure chamber 44.

Thus, the piston 14 pushes the front idler 6 through the rod 11 to give expansion to the track shoe 7.

When the track shoe 7 is not properly adjusted by the above described operation, the pressure of the fluid in the adjusted pressure chamber 44 is not as much as $P_1$, and therefore the spring 39 further pushes the spool 35 and the spool 31 to the right.

The ports 33 and 34 are connected by the right hand movement of said spool 35.

Thus, the pressure of the fluid of the port 30 (the adjusted pressure chamber 44) is $P_5$;

When the port 33 and the port 34 are connected, the fluid under the pressure $P_2$ or $P_3$ of the pressure storing chamber 22 is passed from the port 33 to the port 34, and the pressure of the fluid in the adjusted pressure chamber is raised as far as $P_1$;

When the pressure of the fluid of the adjusted pressure chamber 44 becomes $P_1$, the proper expansion is given to the track shoe 7, and at the same time, the spool 31 pushes the spool 35 to the left hand as the pressure of the fluid of the port 30 becomes $P_1$, and the spring 39 is loosened to disconnect the relation between the port 33 and the port 34.

Therefore, the front idler 6 stops at the position where the track shoe 7 is properly expanded, and there is no fear that the track shoe should be abnormally expanded.

When the track shoe 7 is loosened, the above described operations are repeated, and the track shoe is always properly and automatically expanded.

The expansion of the track shoe assembly is different in accordance with the conditions of the ground where the tractor 1 is driven, and in accordance with the kind of the track shoe.

However, in accordance with the conditions of the ground and the kind of track shoe assembly, it is necessary to adjust the pressure $P_1$ of the fluid of the adjusted pressure chamber 44.

In accordance with the present invention, the above mentioned necessity can be satisfied by turning the pressure adjusting cap 38 to the right or left.

In other words, in FIG. 4, when the pressure adjusting cap 38 is turned to the left, the weight given to the pressure adjusting spring 39 is lowered, and the pressure of the fluid of the port 30, and the pressure $P_1$ of the fluid of the adjusted pressure chamber 44 is also lowered.

On the contrary, when the pressure adjusting cap 38 is turned to the right, the pressure of the fluid in the port 30 and the pressure $P_1$ of the fluid of the adjusted pressure chamber 44 are raised.

Therefore, in accordance with the embodiment of the present invention, it is possible to adjust the track shoe assembly in such a manner that all the conditions can be satisfied, by only one valve regardless of the conditions of the ground on which the track is driven or the kind of the track shoe assembly.

On the other hand, when cruising, if a load is given so as to displace the front idler with abnormal expansion of the track shoe assembly or abnormal impact, the pressure of the fluid in the adjusted pressure chamber 44 becomes more than the pressure $P_1$, but the spool 31 pushes the pressure adjusting spring 39 to the left hand through the spool 35 and the spring receiver 37 to buffer the pressure of the fluid above the pressure $P_1$ as far as the spring receiver 37 is contacted against the stopper 46 of the member 40.

When a load is applied to displace the front idler, the piston 14 of the rod 11 pushes the cylinder 17 in the right hand direction through the fluid of the adjusted pressure chamber 44, and the movement of the cylinder 17 to the right hand direction is applied in the seat 23 through the fluid of the pressure storing chamber 22 to loosen the spring 25 by means of the seat 23.

The stroke of the spring 25 is controlled by the interval H as is shown in FIG. 4.

The buffer effect of the above mentioned front idler has no relation to the mechanism for automatically adjusting the track shoe assembly.

Therefore, when the pressure of the fluid within the adjusted pressure chamber 44 is lowered below $P_1$ the proper expansion is given automatically to the track shoe assembly 7, and when the pressure of the fluid is raised above $P_1$ the spring 25 is loosened to produce a buffer effect, to keep the track shoe assembly in the most appropriate state, and to have the track assembly present sufficient functions.

In the embodiment, the internal diameter of the pressure storing chamber 22 is adjusted to be larger than the internal diameter of the adjusted pressure chamber 44, and therefore the internal G can be made larger even if the interval F should be small.

In other words, when the pressure difference between $P_2$ and $P_3$ is made smaller, the amount of the adjustment of the front idler can be made larger, and at the same time the range of the automatic adjustment of the track shoe assembly is increased.

The above are the descriptions about a preferred embodiment of the present invention, but it is easily understood by those skilled in the art that it is possible to carry out modifications of the form and arrangement of the members without going beyond the scope of the spirit of the present invention in addition to the above described embodiment.

Therefore, it should be understood that the following scope of claim for patent is aimed to include all those modifications as mentioned above falling into the scope of the present invention.

What we claim is:

1. A device for automatically adjusting the track shoe assembly of a crawler tractor comprising:
    a. a sprocket mounted on the rear portion of a track frame;
    b. a front idler;
    c. a track shoe spanned on said sprocket and front idler;
    d. an adjusted pressure chamber including a first cylinder and a first piston mounted on the end of a first rod said first rod being coupled to said idler:
    e. a pressure storing chamber including a second cylinder connected to the rear end portion of said first cylinder;
    f. first and second seats wherein said first seat moves within said second cylinder, and said second seat is fixed to said track frame;
    g. a spring positioned between said first and second seats; and
    h. valve means connected between said pressure storing chamber and said adjusted pressure chamber said valve means including a spool means and a pressure adjusting spring wherein said spool means is positioned such that the force of said spring is on one side and the pressure of said adjusted pressure chamber is on the other side whereby when the pressure in said adjusted pressure chamber falls below a predetermined value the valve means permits fluid communication and thus the transfer of fluid from said pressure storing chamber to said adjusted pressure chamber thereby moving said first rod and thereby said idler to cause said track shoe to be tightened on said sprocket and front idler.

2. A device for automatically adjusting the expansion of a track shoe assembly of a crawler tractor according to claim 1 wherein a second rod is fixed in the central portion of the first seat, and one end portion of said second rod is movably inserted into the second cylinder and a stopper is provided on the end of said second rod.

3. A device for automatically adjusting the expansion of a track shoe assembly of a crawler tractor according to claim 1 comprising a first opening for feeding non-compressive fluid, connected to said adjusted pressure chamber; and a second opening for feeding non-compressive fluid connected to the pressure storing chamber.

4. A device for automatically adjusting the expansion of a track shoe assembly according to claim 1 wherein a drain plug for removing non-compressive fluid, connected to said adjusted pressure chamber, is provided on the wall of the first cylinder.

5. A device for automatically adjusting the expansion of the track shoe assembly of a crawler tractor according to claim 1 wherein a bracket is fixed on the bearing for supporting a rotary shaft of the front idler and said bracket is connected to the rod through yoke.

6. A device for automatically adjusting the expansion of a track shoe assembly of a crawler tractor according to claim 1 wherein said valve means includes a first port connected to said pressure storing chamber and a second port connected to said adjusted pressure chamber wherein said spool means connects and disconnects said two ports.

7. A device for automatically adjusting the expansion of the track shoe assembly of a crawler tractor according to claim 1 wherein said spring is housed in a spring containing cylinder.

* * * * *